(12) United States Patent
Imai

(10) Patent No.: US 10,315,945 B2
(45) Date of Patent: Jun. 11, 2019

(54) OPTICAL ELEMENT MANUFACTURING APPARATUS

(71) Applicant: OLYMPUS CORPORATION, Hachioji-shi, Tokyo (JP)

(72) Inventor: Satoshi Imai, Hanno (JP)

(73) Assignee: OLYMPUS CORPORATION, Tokyo (JP)

( * ) Notice: Subject to any disclaimer, the term of this patent is extended or adjusted under 35 U.S.C. 154(b) by 121 days.

(21) Appl. No.: 15/267,030

(22) Filed: Sep. 15, 2016

(65) Prior Publication Data

US 2017/0001897 A1  Jan. 5, 2017

Related U.S. Application Data

(63) Continuation of application No. PCT/JP2015/060580, filed on Apr. 3, 2015.

(30) Foreign Application Priority Data

Apr. 25, 2014 (JP) ................................. 2014-092094

(51) Int. Cl.
*C03B 11/12* (2006.01)
*C03B 11/06* (2006.01)

(52) U.S. Cl.
CPC ........ *C03B 11/122* (2013.01); *C03B 2215/08* (2013.01); *C03B 2215/66* (2013.01); *C03B 2215/72* (2013.01); *C03B 2215/86* (2013.01)

(58) Field of Classification Search
CPC ........... C03B 11/06–088; B29L 2011/00–0091
See application file for complete search history.

(56) References Cited

U.S. PATENT DOCUMENTS 5,032,160 A * 7/1991 Murata .................. B29C 43/021
264/2.7
5,188,652 A * 2/1993 Nakamura .............. C03B 11/08
65/162

(Continued)

FOREIGN PATENT DOCUMENTS

JP         07025629 A  *  1/1995  ............. C03B 11/08
JP     2010159182 A       7/2010

(Continued)

OTHER PUBLICATIONS

International Search Report (ISR) and Written Opinion dated Jul. 7, 2015 issued in International Application No. PCT/JP2015/060580.

*Primary Examiner* — Jodi C Franklin
(74) *Attorney, Agent, or Firm* — Holtz, Holtz & Volek PC

(57) ABSTRACT

An optical element manufacturing apparatus includes plural pairs of stage units that are each arranged opposite to each other so as to sandwich a mold set that houses a molding material, each of the plural pairs of stage units performing at least one of heating, pressurization, and cooling on the mold set, wherein each of the stage units includes a temperature control block for which temperature is controlled, and in a third direction orthogonal to a first direction and a second direction, the temperature control block includes heating regions that are positioned on sides of both ends and in which heating sources are arranged, and a non-heating region that is positioned on a central side and in which the heating sources are not arranged throughout the first direction, the first direction being a direction in which the plural pairs of stage units are arranged, and the second direction being a direction in which a pair of stage units are opposite to each other.

11 Claims, 9 Drawing Sheets

(56) References Cited

U.S. PATENT DOCUMENTS

| | | | | |
|---|---|---|---|---|
| 5,215,566 | A * | 6/1993 | Yamamoto | C03B 11/08 65/102 |
| 5,228,894 | A * | 7/1993 | Sato | C03B 11/08 65/102 |
| 5,250,099 | A * | 10/1993 | Kubo | C03B 11/08 65/102 |
| 5,284,501 | A * | 2/1994 | Monji | C03B 11/08 264/2.7 |
| 5,344,476 | A * | 9/1994 | Tomida | C03B 11/08 65/102 |
| 5,346,522 | A * | 9/1994 | Komiyama | C03B 11/08 65/102 |
| 5,403,370 | A * | 4/1995 | Morikita | C03B 11/08 65/286 |
| 5,626,641 | A * | 5/1997 | Yonemoto | C03B 7/12 65/122 |
| 5,766,294 | A * | 6/1998 | Takagi | C03B 11/08 65/102 |
| 5,782,946 | A * | 7/1998 | Komiyama | C03B 11/08 65/102 |
| 5,805,361 | A * | 9/1998 | Morimoto | G02B 5/1857 359/819 |
| 5,853,631 | A * | 12/1998 | Linehan | B29C 45/78 264/40.6 |
| 5,904,746 | A * | 5/1999 | Okada | C03B 11/08 425/808 |
| 6,003,338 | A * | 12/1999 | Yamamoto | C03B 11/08 264/1.1 |
| 7,143,609 | B2 * | 12/2006 | Aitken | C03B 11/082 65/26 |
| 7,473,091 | B2 * | 1/2009 | Woo | C03B 11/005 425/406 |
| 2002/0054976 | A1 * | 5/2002 | Nakamura | B28D 1/041 428/66.6 |
| 2003/0033833 | A1 * | 2/2003 | Fujimoto | C03B 11/08 65/102 |
| 2004/0071513 | A1 * | 4/2004 | Hosoe | B29C 31/08 406/108 |
| 2004/0123628 | A1 * | 7/2004 | Stoehr | C03B 11/08 65/102 |
| 2005/0178157 | A1 * | 8/2005 | Yoneda | C03B 11/005 65/32.1 |
| 2008/0209946 | A1 * | 9/2008 | Tanaka | C03B 11/08 65/244 |
| 2008/0303179 | A1 * | 12/2008 | Tanaka | C03B 11/122 264/1.1 |
| 2009/0320522 | A1 * | 12/2009 | Miyazaki | C03B 11/08 65/29.12 |
| 2013/0127086 | A1 * | 5/2013 | Derks | B29C 47/0021 264/173.16 |
| 2013/0316194 | A1 * | 11/2013 | Isono | G11B 5/8404 428/846.9 |
| 2013/0327094 | A1 * | 12/2013 | Urai | C03B 11/122 65/66 |
| 2014/0283555 | A1 * | 9/2014 | Masuda | C03B 11/12 65/106 |
| 2015/0050378 | A1 * | 2/2015 | Fujiwara | B29C 43/36 425/415 |
| 2017/0015025 | A1 * | 1/2017 | Yanagisawa | B29C 43/36 |
| 2017/0081234 | A1 * | 3/2017 | Hirose | G02B 3/00 |

FOREIGN PATENT DOCUMENTS

| | | | | |
|---|---|---|---|---|
| JP | | 2012116705 A | 6/2012 | |
| JP | | 2013252986 A | 12/2013 | |
| WO | WO-2013103102 A1 * | | 7/2013 | C03B 11/00 |

* cited by examiner

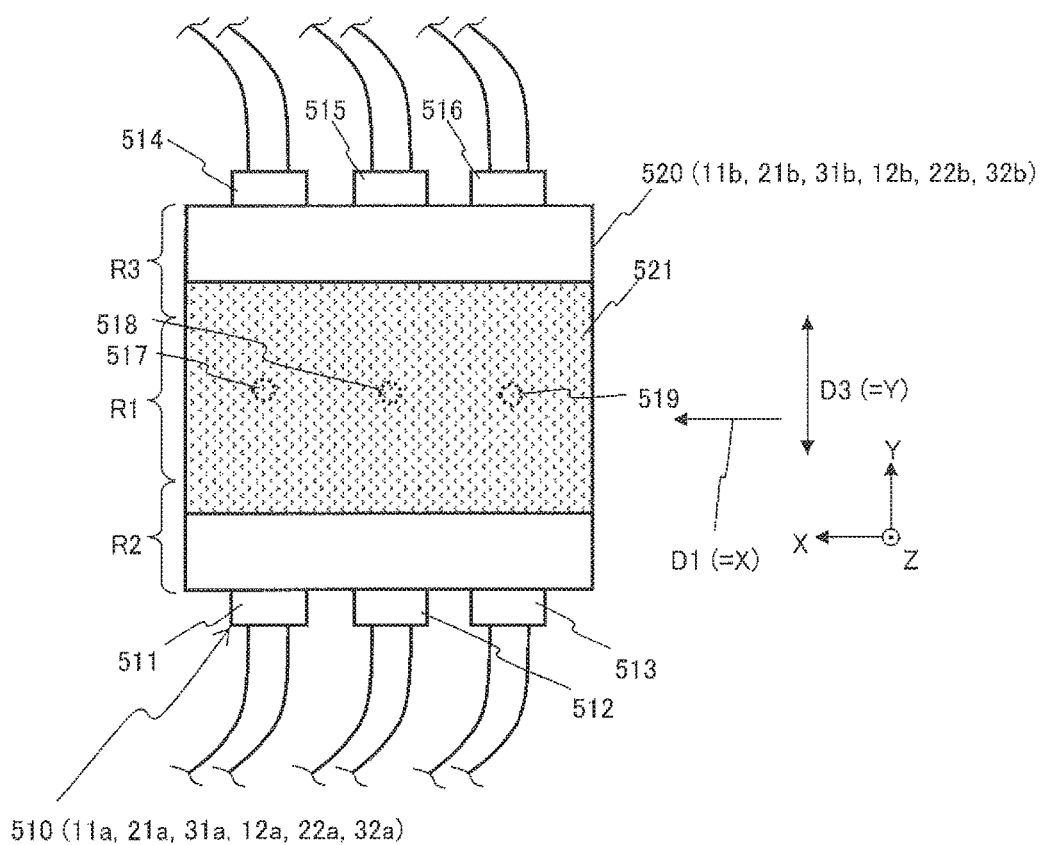
F I G. 9

OPTICAL ELEMENT MANUFACTURING APPARATUS

CROSS REFERENCE TO RELATED APPLICATIONS

This is a Continuation Application of PCT application No. PCT/JP2015/060580, filed Apr. 3, 2015, which was not published under PCT Article 21(2) in English.

This application is based upon and claims the benefit of priority from the prior Japanese Patent Application No. 2014-092094, filed Apr. 25, 2014, the entire contents of which are incorporated herein by reference.

BACKGROUND OF THE INVENTION

Field of the Invention

The present invention relates to an optical element manufacturing apparatus that manufactures an optical element.

Description of the Related Art

In recent years, improvements in performance and functioning of optical elements such as lenses, prisms, or mirrors have been required, and a method for improving performance by changing an optical surface shape to an aspherical shape is known, for example. In particular, in mass-producing an optical element having an aspherical shape, a manufacturing method for pressurizing a molding material that has been heated and softened by using a mold is employed.

There are needs for an optical element having a middle or large diameter. Therefore, it is necessary to cope with mass-production of optical elements having a middle or large diameter. Examples of an optical element manufacturing apparatus that is suitable to mass-produce an optical element which is not limited to the optical element having a middle or large diameter include the following.

An optical element manufacturing method for sequentially conveying a molding material housed in a mold set to respective stages for heating, pressurization, and cooling so as to manufacture a desired optical element is known. The mold set includes, for example, an upper mold, a lower mold, a drum mold, and the like. The drum mold is a cylindrical member that is positioned around the upper mold and the lower mold.

In the optical element manufacturing apparatus, plural pairs of upper and lower stage units are arranged so as to function as a heating stage, a pressurization stage, a cooling state, or the like.

A temperature control block is mounted onto the stage unit. The temperature of the temperature control block can be controlled, and the temperature control block is set to satisfy a condition for a corresponding process (a heating process, a pressurization process, or a cooling process).

A heating source and a temperature measurement unit are buried in the temperature control block. A method is employed for detecting a temperature at a prescribed position by usually using a plurality of cartridge type heaters as the heating source, and using a temperature sensor such as a thermocouple as the temperature measurement unit.

The temperature control block is connected to a control unit that functions as a temperature output adjustment device outside the stage unit. In the temperature control block, an output state of the heating source is adjusted according to a signal output from the temperature sensor such that a temperature state is controlled.

A method has been proposed for improving a temperature distribution by providing the temperature control block above with portions that respectively have a high watt density and a low watt density in a heater cartridge (see, for example, Japanese Laid-Open Patent Publication No. 2012-116705).

SUMMARY OF THE INVENTION

In one aspect, an optical element manufacturing apparatus includes plural pairs of stage units that are each arranged opposite to each other so as to sandwich a mold set that houses a molding material, each of the plural pairs of stage units performing at least one of heating, pressurization, and cooling on the mold set, each of the stage units includes a temperature control block for which temperature is controlled, and in a third direction orthogonal to a first direction and a second direction, the temperature control block includes heating regions that are positioned on sides of both ends and in which heating sources are arranged, and a non-heating region that is positioned on a central side and in which the heating sources are not arranged throughout the first direction, the first direction being a direction in which the plural pairs of stage units are arranged, and the second direction being a direction in which a pair of stage units are opposite to each other.

BRIEF DESCRIPTION OF THE DRAWINGS

FIG. 9 is a plan view illustrating an equalizing member and a temperature control block according to a fifth embodiment.

DETAILED DESCRIPTION OF INVENTION

A configuration in which portions that respectively have a high watt density and a low watt density are provided in a heater cartridge in order to improve a temperature distribution, as described above, is complicated in structure. A phenomenon can be confirmed in which a temperature distribution of a surface of a temperature control block in a stage unit decreases in temperature toward both ends in a horizontal direction orthogonal to an arrangement direction of plural pairs of stage units (toward sides in contact with an atmosphere), not toward both of the ends in the arrangement direction. This is because a central portion of the temperature control block has a small amount of heat radiation such that heat is likely to stay in the central portion of the temperature control block, and because both of the ends in the arrangement direction receive an influence of heat radiation from adjacent temperature control blocks.

When the temperature control block has a temperature distribution, the temperature distribution is propagated to molding surfaces of an upper mold and a lower mold of a mold set. The temperature distribution on the molding surface is accumulated as internal distortion in a molding material being molded, and this results in deterioration in shape accuracy of an optical element.

An optical element manufacturing apparatus according to embodiments is described below with reference to the drawings.

First Embodiment

Figure 1:
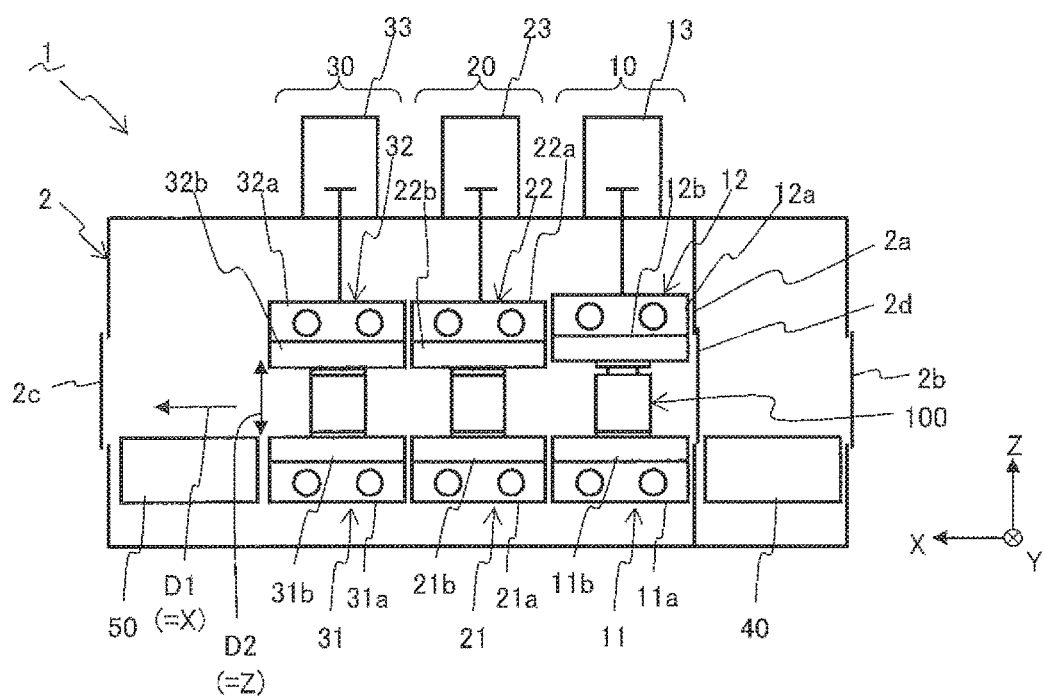
FIG. 1 is a front view illustrating an internal configuration of an optical element manufacturing apparatus according to a first embodiment.

FIG. 1 is a sectional view illustrating an optical element manufacturing apparatus 1 according to a first embodiment.

The optical element manufacturing apparatus 1 illustrated in FIG. 1 includes a molding chamber 2, a heating stage 10, a pressurization stage 20, a cooling stage 30, an insertion-side placing table 40, and an ejection-side placing table 50.

The molding chamber 2 includes a shielding plate 2a, an insertion-side shutter 2b, an ejection-side shutter 2c, and an internal shutter 2d.

The shielding plate 2a is arranged inside the molding chamber 2, and separates a space (a preliminary chamber) in which the insertion-side placing table 40 is arranged from a space (a molding space) in which the heating stage 10, the pressurization stage 20, the cooling stage 30, and the ejection-side placing table 50 are arranged.

The insertion-side shutter 2b is controlled so as to be opened when a mold set 100 is inserted into the molding chamber 2. The ejection-side shutter 2c is controlled so as to be opened when the mold set 100 is ejected from the molding chamber 2. The molding chamber 2 is sealed by the insertion-side shutter 2b and the ejection-side shutter 2c.

The inside of the molding chamber 2 is replaced with air, or inert gas (Ar gas or the like) or nitrogen gas ($N_2$ or the like). When inert gas or nitrogen gas is used, the gas is supplied inside the molding chamber 2 via a pipe (not illustrated).

Inside the molding chamber 2, a plurality of mold sets 100 are continuously transferred to the insertion-side placing table 40, the heating stage 10, the pressurization stage 20, the cooling stage 30, and the ejection-side placing table 50 in this order.

The heating stage 10, the pressurization stage 20, and the cooling stage 30 respectively include pairs of lower stage units 11, 21, and 31 and upper stage units 12, 22, and 32, and pressurizers 13, 23, and 33.

The lower stage unit 11, 21, or 31 and the upper stage unit 12, 22, or 32 are arranged opposite to each other so as to sandwich the mold set 100.

The lower stage units 11, 21, and 31 respectively include temperature control blocks 11a, 21a, and 31a and equalizing members 11b, 21b, and 31b. Similarly, the upper stage units 12, 22, and 32 respectively include temperature control blocks 12a, 22a, and 32a and equalizing members 12b, 22b, and 32b.

As described later in detail, a cartridge heater that is an example of a heating source and a thermocouple that is an example of a temperature measurement unit are arranged in each of the temperature control blocks 11a, 21a, 31a, 12a, 22a, and 32a.

The equalizing members 11b, 21b, 31b, 12b, 22b, and 32b have, for example, a plate shape or a block shape, and are positioned closer to the mold sets 100 than the temperature control blocks 11a, 21a, 31a, 12a, 22a, and 32a. The equalizing members 11b, 21b, 31b, 12b, 22b, and 32b abut onto the mold sets 100.

Figure 2A:
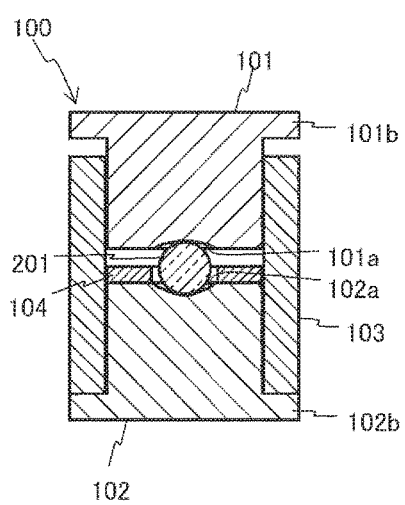
FIG. 2A is a sectional view (no. 1) illustrating a mold set according to the first embodiment.
Figure 2B:
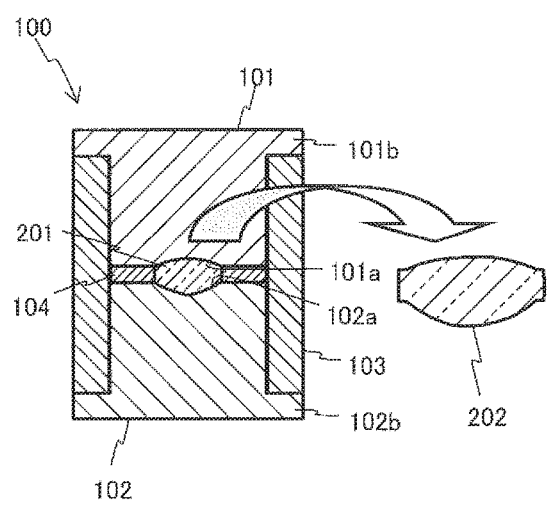
FIG. 2B is a sectional view (no. 2) illustrating a mold set according to the first embodiment.

The pressurizers 13, 23, and 33 vertically move the upper stage units 12, 22, and 32 so as to pressurize the mold set 100 that is conveyed between the upper stage units 12, 22, and 32 and the low stage unit 11, 21, and 31, and thereby pressurize a molding material 201 illustrated in FIGS. 2A and 2B. The molding material 201 is, for example, glass, and an optical element 202 manufactured from the molding material 201 is, for example, a glass lens.

The lower stage units 11, 21, and 31 are fixed, for example, to a base in the molding chamber 2. Heat insulation blocks or cooling blocks may be interposed between the lower stage units 11, 21, and 31 and the base and between the upper stage units 12, 22, 32 and the pressurizers 13, 23, and 33 such that heat is less likely to be conducted to the entirety of the optical element manufacturing apparatus 1.

In the optical element manufacturing apparatus 1, a pipe through which cooling water flows around the base and the pressurizers 13, 23, and 33 may be installed such that overheating is prevented or temperature is stabilized. The optical element manufacturing apparatus 1 is controlled by a control unit (not illustrated) in such a way that operation control is performed on respective units and that temperature control is performed on the lower stage units 11, 21, and 31 and the upper stage units 12, 22, and 32.

Here, a direction in which the heating stage 10, the pressurization stage 20, and the cooling stage 30 (the lower stage units 11, 21, and 31 and the upper stage units 12, 22 and 32) are arranged, namely, a direction in which the mold set 100 is transferred is referred to as a first direction (an arrow D1). The first direction (the arrow D1) matches an X direction in an XYZ coordinate system in which X, Y, and Z axes are orthogonal to each other.

A direction in which the lower stage units 11, 21, and 31 are opposite to the upper stage units 12, 22, and 32 is referred to as a second direction (an arrow D2). The second direction (the arrow D2) matches a Z direction in the XYZ coordinate system in which X, Y, and Z axes are orthogonal to each other.

Each of the stages 10, 20, and 30 (a pair of the lower stage unit 11, 21, or 31 and the upper stage unit 12, 22, or 32) may be subdivided in order to perform more detailed control. As an example, a plurality of part or all of the heating stage 10, the pressurization stage 20, and the cooling stage 30 may be arranged. Alternatively, a single stage that performs a heating process and a pressurization process or a single stage that performs both the pressurization process and a cooling process may be arranged such that the number of stages becomes two.

As illustrated in FIGS. 2A and 2B, the mold set 100 includes an upper mold 101, a lower mold 102, a drum mold 103, and an auxiliary mold 104.

The upper mold 101 and the lower mold 102 are arranged opposite to each other. The upper mold 101 and the lower mold 102 have, for example, a columnar shape.

In the upper mold 101, a molding surface 101a having, for example, a concave shape is formed on a bottom surface. In the lower mold 102, a molding surface 102a having a concave shape is formed on an upper surface.

At an upper end of the upper mold 101, a stepped unit 101b is formed. Also at a lower end of the lower mold 102, a stepped unit 102b is formed.

The drum mold 103 has a cylindrical shape. The drum mold 103 is arranged between the stepped unit 101b of the upper mold 101 and the stepped unit 102b of the lower mold 102 around the upper mold 101 and the lower mold 102. The upper mold 101 can slide in a state in which an outer peripheral surface of the upper mold 101 is brought into contact with an inner peripheral surface of the drum mold 103.

The auxiliary mold 104 has, for example, a ring shape (a disk shape having a through hold in the middle). The auxiliary mold 104 is arranged between the upper mold 101 and the lower mold 102 inside the drum mold 103.

It is preferable that, as an example, hard metal, silicon carbide, stainless steel, or the like be used as a material of the mold set 100 (the upper mold 101, the lower mold 102, the drum mold 103, and the auxiliary mold 104) in terms of resistance to heat or a load. It is preferable that a membrane coating be applied on the molding surfaces 101a and 102a of the upper mold 101 and the lower mold 102 from the point of view of durability, and from the point of view of releasability of the molding material 201 from the upper mold 101 and the lower mold 102. Further, surface treatment using a mold release agent may be performed on the molding surfaces 101a and 102a by using a physical or chemical means.

The mold set 100 according to the first embodiment is an example, and any mold set can be employed that houses the molding material 201 and that can transfer the shape of a molding surface to the molding material 201. As an example, the auxiliary mold 104 may be omitted from the mold set 100.

As the molding material 201, optical glass or optical resin that is a thermoplastic material can be employed as an example. As an example, L-BSL7 (manufactured by Ohara Inc.; glass transition point: 498° C.; yield point: 549° C.) or the like is known as the optical glass. A method for manufacturing the optical element 202 is described later.

Figure 3:
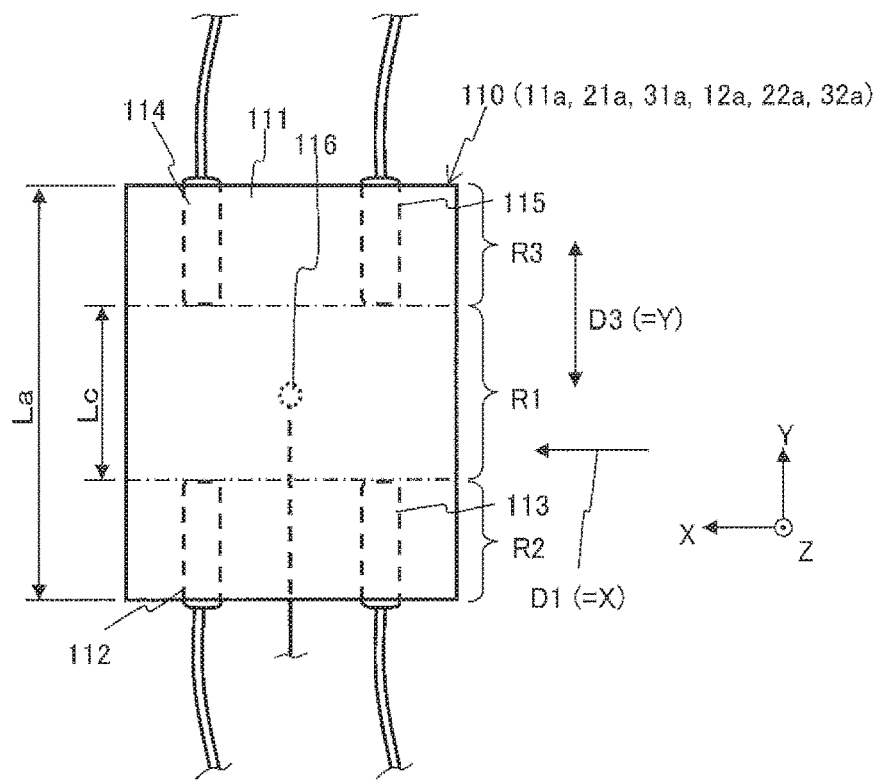
FIG. 3 is a plan view illustrating a temperature control block according to the first embodiment.

FIG. 3 is a plan view illustrating a temperature control block 110 according to the first embodiment.

The temperature control block 110 illustrated in FIG. 3 can be used as the temperature control blocks 11a, 21a, 31a, 12a, 22a, and 32a illustrated in FIG. 1.

The temperature control block 110 includes a block body 111, cartridge heaters 112 to 115 that are examples of a heating source, and a thermocouple 116 that is an example of a temperature measurement unit.

The temperature control block 110 includes heating regions R2 and R3 in which the cartridge heaters 112 to 115 are arranged, at both ends in a third direction (arrow D3) that is orthogonal to the first direction (arrow D1) in which the mold set 100 is transferred and the second direction (arrow D2) in which a pair of stage units (11 and 12, 21 and 22, or 31 and 32) are opposite to each other. The temperature control block 110 also includes a non-heating region R1 that is positioned on a central side in the third direction (the arrow D3). The non-heating region R1 is a region in which the cartridge heaters 112 to 115 are not arranged throughout the first direction (the arrow D1). The third direction (the arrow D3) matches a Y direction in the XYZ coordinate system in which X, Y, and Z axes are orthogonal to each other.

Figure 4:
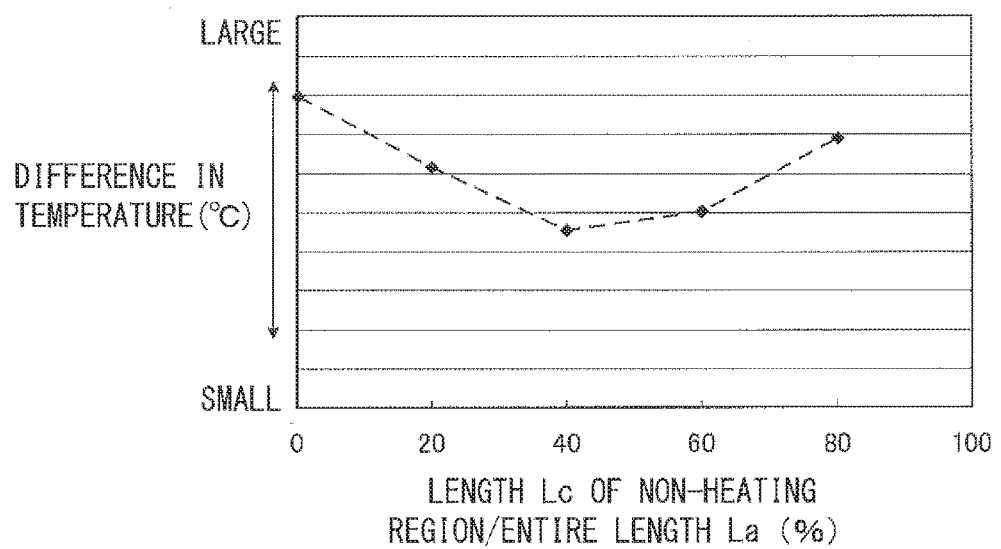
FIG. 4 is a graph illustrating a relationship between a dimension ratio of a non-heating region and a difference in temperature according to the first embodiment.

Here, in the third direction (the arrow D3), when a ratio Lc/La of a length Lc of the non-heating region R1 to the entire length La of the temperature control block 110 becomes excessively low or high, a difference in temperature on the surface (on the side of the mold set 100) of the temperature control block 110 increases, as illustrated in FIG. 4. Therefore, it is preferable that the ratio Lc/La satisfy 0.2≤Lc/La≤0.8 in order to improve a temperature distribution by 10% or more. It is particularly preferable that the ratio Lc/La satisfy 0.4≤Lc/La≤0.6.

Figure 5:
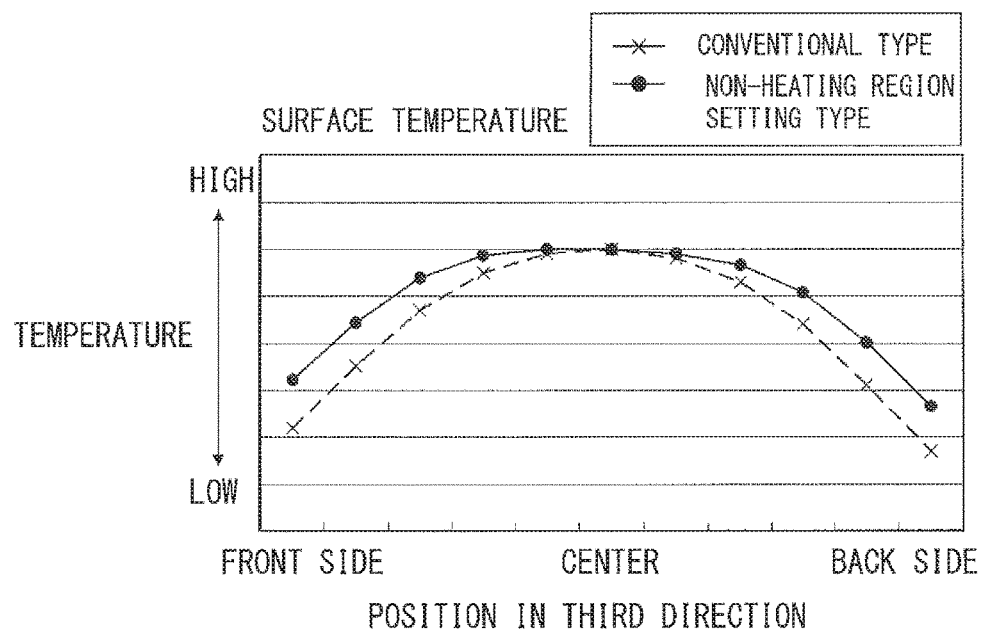
FIG. 5 is a graph illustrating a relationship between a position in a third direction and a temperature of a temperature control block according to the first embodiment.

As illustrated in FIG. 5, as an example, in a case in which the ratio Lc/La is 3/7 (a non-heating region setting type), a temperature on the surface (on the side of the mold set 100) of the temperature control block 110 is less likely to decrease even around both ends (a front side and a back side) in the third direction (the arrow D3), compared with a case in which Lc is 0, namely, a case in which the non-heating region is not specified (a conventional type). Temperature in the center in the third direction (the arrow D3) is the same between the non-heating region setting type and the conventional type, because a case is assumed in which control is performed such that temperature in the center of the temperature control block 110 is the same.

The non-heating region R1 has only to be provided in at least one of the stage units 11, 21, 31, 12, 22, and 32, but it is preferable that the non-heating regions R1 be provided in both of a pair of the lower stage unit 11, 21, or 31 and the upper stage unit 12, 22, or 32. It is the most effective to provide the non-heating region R1 in the cooling stage 30, and it is the second most effective to provide the non-heating region R1 in the pressurization stage 20. This is because a cooling process in the cooling stage 30 is a process in which the molding material 201 changes from a softening state in which the molding material 201 is flowable to a solidified state in which the molding material 201 does not flow, and is a process in which a shape accuracy of the optical element 202 is determined most.

In the block body 111 illustrated in FIG. 3, insertion holes that the cartridge heaters 112 to 115 are inserted into and an insertion hole that the thermocouple 116 is inserted into are formed. It is preferable that, as an example, stainless steel, hard metal, silicon carbide, aluminum nitride, ceramics, or the like be used as a material of the block body 111 in terms of resistance to heat or load.

The cartridge heaters 112 to 115 are inserted into the insertion holes of the block body 111. As an example, two of the cartridge heaters 112 to 115 are inserted into the block body 111 from each of the ends in the third direction. The number of cartridge heaters 112 to 115 that are inserted into each of the heating regions R2 and R3 may be one, or may be three or more.

The cartridge heaters 112 to 115 are connected to a control unit (not illustrated), and an output of each of the cartridge heaters 112 to 115 has been selected by using, for example, a set temperature such that temperature is controlled. Consequently, the temperature of the temperature control block 110 is controlled.

The thermocouple 116 measures a temperature almost in the center of the non-heating region R1. The thermocouple 116 may be exposed on the surface of the temperature control block 110, or may be buried into the temperature control block 110. The control unit (not illustrated) controls the temperature of the cartridge heaters 112 to 115 in accordance with a measurement result of the thermocouple 116.

An optical element manufacturing method according to the first embodiment is described below with reference to FIGS. 1, 2A, and 2B.

A process for manufacturing the optical element 202 from the molding material 201 by using the mold set 100 is performed in the order of an assembly process, a heating process, a pressurization process, a cooling process, and a disassembly process on the mold set 100. Usually, the assembly process and the disassembly process on the mold set 100 are performed outside the optical element manufacturing apparatus 1. In the optical element manufacturing apparatus 1, the heating process, the pressurization process, and the cooling process are sequentially performed.

<Assembly Process>

The assembly process on the mold set 100 is described first.

In a state in which the auxiliary mold 104 is placed on an upper surface of the lower mold 102, the molding material 201 having, for example, a ball shape is inserted into a through hole of the auxiliary mold 104, and is placed on the molding surface 102a of the lower mold 102.

In this state, the drum mold 103 is fitted around the lower mold 102 and the auxiliary mold 104, and the upper mold 101 is arranged in such a way that the molding surface 101a of the upper mold 101 is opposite to the molding material 201 on the lower mold 102.

By sandwiching the molding material 201 between the upper mold 101 and the lower mold 102 that have been inserted into the drum mold 103 in such a way that the upper mold 101 and the lower mold 102 are opposite to each other, as described above, assembly of the mold set 100 is completed. Then, the assembled mold sets 100 are arranged on an insertion side of the optical element manufacturing apparatus 1, and are sequentially inserted into the molding chamber 2 with the insertion-side shutter 2b open.

<Heating Process>

The heating process for heating and softening the molding material 201 is described next.

Before the mold set 100 is transferred to a molding space in which the pressurization stage 20 and the like are arranged in the molding chamber 2, the inside of the mold set 100 is replaced with nitrogen gas in a space (a preliminary chamber) in which the insertion-side placing table 40 is arranged.

Then, the internal shutter 2d of the shielding plate 2a is opened in a pre-stage in which the mold set 100 is transferred to the heating stage 10, and the internal shutter 2d is closed in a post-stage in which transfer is finished.

The mold set 100 is transferred from the insertion-side placing table 40 onto the lower stage unit 11 of the heating stage 10 by a transfer robot. The upper stage unit 12 of the heating stage 10 is driven by the pressurizer 13 so as to be lowered down.

The mold set 100 is held in a state in which the mold set 100 is sandwiched between the lower stage unit 11 and the upper stage unit 12.

The temperature of the lower stage unit 11 and the upper stage unit 12 is kept around a molding temperature by the temperature control blocks 110, 11a, and 12a described above.

The mold set 100 illustrated in FIG. 2A and the molding material 201 housed in the mold set 100 are heated via the lower stage unit 11 and the upper stage unit 12 during a prescribed time period in such a way that the temperature of the molding material 201 reaches a molding temperature according to the molding material 201. The molding temperature is set to a temperature higher than the yield point temperature of glass used for the molding material 201. Consequently, the molding material 201 enters into a softening state below the molding temperature. When the heating process above is finished, the upper stage unit 12 is driven by the pressurizer 13 to move upward.

<Pressurization Process>

The pressurization process for pressurizing the optical material 201 is described next.

The mold set 100 is transferred from the lower stage unit 11 of the heating stage 10 to the lower stage unit 21 of the pressurization stage 20 by the transfer robot. The upper stage unit 22 of the pressurization stage 20 is driven by the pressurizer 23 so as to be lowered down.

The mold set 100 illustrated in FIG. 2A is pressurized between the lower stage unit 21 and the upper stage unit 22 in a state in which the mold set 100 is kept at the molding temperature.

As illustrated in FIG. 2B, in the mold set 100, the molding material 201 that is pressed between the upper mold 101 and the lower mold 102 is filled into a space surrounded by the upper mold 101, the lower mold 102, and the auxiliary mold 104, while being deformed.

Pressurization of the upper stage unit 22 is stopped at a stage at which the optical element 202 having a desired shape is obtained from the molding material 201 having a ball shape, and molding is finished.

In order to obtain the optical element 202 having a desired shape, an amount of movement of the upper stage unit 22 may be controlled, or the upper stage unit 22 may be controlled by setting a pressurizing force and a pressurization time, when the mold set 100 is pressurized between the lower stage unit 21 and the upper stage unit 22, as described above. When the pressurization process above is finished, the upper stage unit 22 is driven by the pressurizer 23 so as to move upward.

<Cooling Process>

The cooling process for cooling the molding material 201 is described next.

The mold set 10 is transferred from the lower stage unit 21 of the pressurization stage 20 to the lower stage unit 31 of the cooling stage 30 by the transfer robot. Then, the upper stage unit 32 of the cooling stage 30 is driven by the pressurizer 33 so as to be lowered down.

The temperature of the lower stage unit 31 and the upper stage unit 32 is kept at a temperature at which the mold set 100 and the molding material 201 can be cooled down by the temperature control blocks 110, 31a, and 32a described above. Usually, the cooling temperature is set to a temperature lower than a glass transition point temperature of the molding material 201.

The mold set 100 is held in a state in which the mold set 100 is sandwiched between the lower stage unit 11 and the upper stage unit 12, and is cooled down to the cooling temperature. In the cooling process, pressure is held by applying cooling pressure in such a way that the molding material 201 in a softening state is not released from the upper mold 101 and the lower mold 102 until the molding material 201 is sufficiently solidified. In particular, in order to control a mold-release timing, it is effective to employ a method for increasing the cooling pressure and rapidly reducing pressure immediately before the mold set is conveyed to an adjacent shaft.

At the time of cooling, a pressurization state may be needed in order to secure a transfer accuracy of the molded optical element 202 and to reduce distortion. A pressurizing force at the time of cooling is specified within a range in which cracks are not generated in the optical element 202 that has been molded.

In the cooling process, the heated molding material 201 (optical glass) is transited from a softening state to a solidified state, and the shape of the optical element 202 is stabilized.

When the mold set 100 is conveyed from the pressurization stage 20 to the cooling stage 30, the temperature inside the mold set 100 rapidly decreases. Therefore, the molding material 201 that is glass in the softening state is rapidly cooled down, and the solidified state of glass is likely to have variations.

Accordingly, it is effective for a heat insulator to be installed between an upper surface of the lower stage unit 31 and a bottom surface of the mold set 100 such that a change in temperature is reduced. As an example of the heat insulator, a material having a low thermal conductivity may be used, or a contact area may be reduced. As described below in a fifth embodiment, the heat insulators are provided, for example, in the equalizing members 11b, 21b, 31b, 12b, 22b, and 32b.

When the mold set 100 and the molding material 201 are cooled down, the upper stage unit 32 is driven by the pressurizer 33 so as to move upward.

The mold set 100 is transferred from the lower stage unit 31 of the cooling stage 30 onto the ejection-side placing table 50 by the transfer robot. Then, the mold set 100 stands by on the ejection-side placing table 50, and is sufficiently cooled down.

<Disassembly Process>

The disassembly process for disassembling the mold set 100 and taking out the manufactured optical element 202 is described next.

The mold set 100 is ejected from the ejection-side placing table 50 to the outside of the molding chamber 2 in a state in which the ejection-side shutter 2c is opened. Then, the mold set 100 is disassembled in a procedure reverse to the assembly process. The molded optical element 202 is obtained from the disassembled mold set 100. The shapes of the molding surfaces 101a and 102a of the upper mold 101 and the lower mold 102 are transferred to the optical element 202 such that optical function surfaces are formed on both sides in an optical-axis direction in the obtained optical element 202.

By repeating the processes above, an optical element is cyclically manufactured by using the mold set 100. By using a plurality of mold sets 100 and inserting the plurality of mold sets 100 in the molding chamber 2, the number of molded optical elements per unit time can be improved.

According to the first embodiment described above, plural pairs of the lower stage units 11, 21, and 31 and the upper stage units 12, 22, and 32 that are each an example of a pair of stage units are arranged. The lower stage units 11, 21, and 31 and the upper stage units 12, 22, and 32 are arranged opposite to each other so as to sandwich the mold set 100 that houses the molding material 201, and the lower stage units 11, 21, and 31 and the upper stage units 12, 22, and 32 perform at least one of heating, pressurization, and cooling on the mold set 100. The lower stage units 11, 21, and 31 and the upper stage units 12, 22, and 32 include the temperature control blocks 110, 11a, 21a, 31a, 12a, 22a, and 32a for which temperature is controlled. The third direction (the arrow D3) is a direction that is orthogonal to the first direction (the arrow D1), which is a direction in which the respective stages 10, 20, and 30 (the plural pairs of stage units 11, 21, 31, 12, 22, and 32) are arranged, and the second direction (the arrow D2), which is a direction in which a pair of stage units (the lower stage unit 11, 21, or 31 and the upper stage unit 12, 22, or 32) are opposite to each other. In the third direction (the arrow D3), the temperature control block 110, 11a, 21a, 31a, 12a, 22a, or 32a includes the heating regions R2 and R3 that are located on both sides in the third direction and in which the cartridge heaters 112 to 115 (examples of a heating source) are arranged, and the non-heating region R1 that is located on a central side and in which the cartridge heaters 112 to 115 are not arranged throughout the first direction (the arrow D1).

Accordingly, by using a simple configuration in which the non-heating region R1 in which the cartridge heaters 112 to 115 are not arranged throughout the first direction (the arrow D1) that is a direction in which the respective stages 10, 20, and 30 are arranged, a phenomenon can be prevented in which the temperature control blocks 110, 11a, 21a, 31a, 12a, 22a, and 32a decrease in temperature toward the sides of both ends in contact with an atmosphere in the third direction (the arrow D3). Consequently, a temperature distribution can be prevented from being propagated to the molding surfaces 101a and 102a of the upper mold 101 and the lower mold 102 of the mold set 100, and shape accuracy of the optical element 202 can be prevented from deteriorating due to internal distortion accumulated in the molding material 201 being molded.

According to the first embodiment, the accuracy of the optical element 202 can be improved by using a simple configuration.

According to the first embodiment, in the third direction (the arrow D3), in a case in which a ratio of a length Lc of the non-heating region R1 to the entire length La of the temperature control block 110, 11a, 21a, 31a, 12a, 22a, or 32a satisfies $0.2 \leq Lc/La \leq 0.8$, a difference in temperature can be further suppressed from being generated in the temperature control block 110, 11a, 21a, 31a, 12a, 22a, or 32a, as illustrated in FIG. 4.

Second Embodiment

Figure 6:
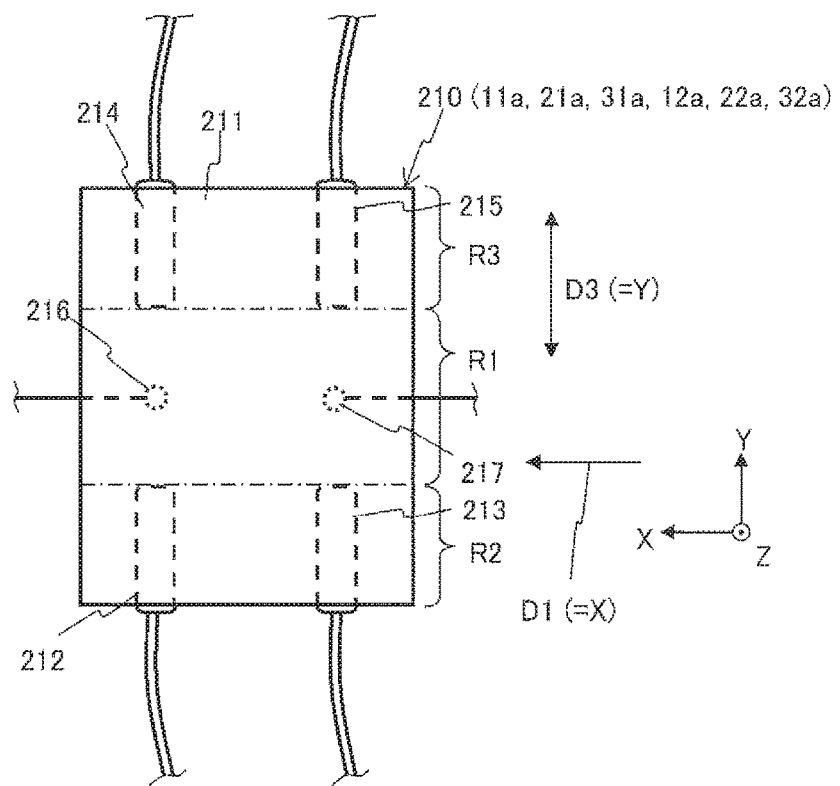
FIG. 6 is a plan view illustrating a temperature control block according to a second embodiment.

FIG. 6 is a plan view illustrating a temperature control block 210 according to a second embodiment.

The second embodiment is similar to the first embodiment described above, except that two thermocouples 216 and 217 are arranged, and therefore the thermocouples 216 and 217 are principally described.

The temperature control block 210 illustrated in FIG. 6 includes a block body 211, cartridge heaters 212 to 215 that are examples of a heating source, and the thermocouples 216 and 217 that are examples of a temperature measurement unit. The temperature control block 210 can be used as the temperature control block 11a, 21a, 31a, 12a, 22a, or 32a illustrated in FIG. 1.

The two thermocouples 216 and 217 are arranged in a non-heating region R1 so as to have a space from each other in a first direction (an arrow D1). A thermocouple that does not have any space from the thermocouples 216 and 217 may be further arranged in the first direction (the arrow D1).

As an example, two of the cartridge heaters 212 to 215 are inserted into the block body 211 from each of the ends in a third direction (an arrow D3), similarly to the first embodiment described above.

The cartridge heaters 212 and 213 in the heating region R2 and the cartridge heaters 214 and 215 in the heating region R3 are arranged so as to sandwich the thermocouples 216 and 217 in the third direction (the arrow D3). When the thermocouples 216 and 217 are sandwiched in the third direction (the arrow D3), a position of the block body 111 in a thickness direction (a Z direction) may be displaced.

According to the second embodiment, two of the cartridge heaters 212 to 215 and the other two of the cartridge heaters 212 to 215 are positioned so as to sandwich the thermocouples 216 and 217. However, three or more of the cartridge heaters 212 or 215 and the other three or more of the cartridge heaters 212 or 215 may be positioned so as to sandwich three or more thermocouples 216 or 217. Alternatively, the third cartridge heater and after of the cartridge heaters 212 to 215 may not sandwich the thermocouples 216 and 217.

According to the second embodiment described above, with respect to matters similar to those according to the first embodiment described above, a similar effect, namely, an effect whereby the accuracy of the optical element 202 can be improved by using a simple configuration, can be achieved.

According to the second embodiment, the temperature control block 210, 11a, 21a, 31a, 12a, 22a, or 32a includes the thermocouples 216 and 217 (examples of a temperature measurement unit) that are arranged so as to have a space from each other in the first direction (the arrow D1) that is a direction in which the respective stages 10, 20, and 30 are arranged in the heating regions R2 and R3. The cartridge heaters 212 to 215 (an example of a plurality of heating sources) are arranged in the respective heating regions R2 and R3 that are positioned on the sides of both ends of the temperature control block 210 in the third direction (the arrow D3) so as to sandwich the thermocouples 216 and 217 in the third direction (the arrow D3).

Accordingly, a temperature distribution of the temperature control block 210, 11a, 21a, 31a, 12a, 22a, or 32a can be accurately obtained by the thermocouples 216 and 217 in the non-heating region R1, and temperature can be controlled. Therefore, the accuracy of the optical element 202 can be further improved.

Third Embodiment

Figure 7:
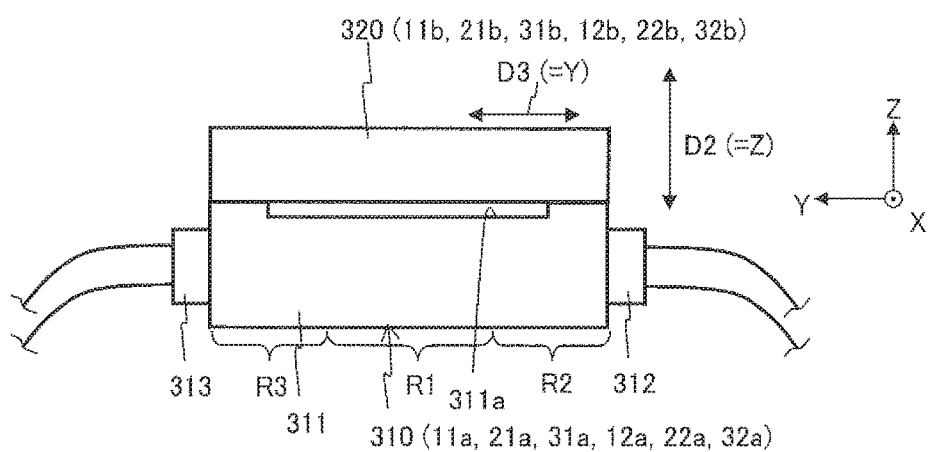
FIG. 7 is a side view illustrating an equalizing member and a temperature control block according to a third embodiment.

FIG. 7 is a side view illustrating an equalizing member 320 and a temperature control block 310 according to a third embodiment.

According to the third embodiment, a configuration similar to the configuration according to the first or second embodiment described above can be employed, except that a recess 311a (an example of a non-contact unit) in which an equalizing member 320 is not brought into contact with a block body 311 is provided. Therefore, the recess 311a is principally described.

The temperature control block 310 illustrated in FIG. 7 includes the block body 311, and cartridge heaters 312 and 313 that are examples of a heating source. The temperature control block 310 has a thermocouple, but the thermocouple is not illustrated in FIG. 7.

The equalizing member 320 is arranged closer to the mold set 100 illustrated in FIGS. 2A and 2B than the temperature control block 310. It is preferable that a material of the equalizing member 320 have a high thermal conductivity.

The temperature control block 310 and the equalizing member 320 illustrated in FIG. 7 can be used as the lower stage units 11, 21, and 31 or the upper stage units 12, 22, and 32 illustrated in FIG. 1.

In a non-heating region R1 in the block body 311, the recess 311a is formed as an example of a non-contact unit in which the block body 311 is not brought into contact with the equalizing member 320 (a region opposite to the non-heating region R1 in the equalizing member 320).

As the non-contact unit, a rough surface may be used. The non-contact unit may be provided only in the region opposite to the non-heating region R1 in the equalizing member 320, or may be provided in both the block body 311 and the equalizing member 320.

According to the third embodiment described above, with respect to matters similar to those according to the first or second embodiment described above, a similar effect, namely, an effect whereby the accuracy of the optical element 202 can be improved by using a simple configuration, can be achieved.

According to the third embodiment, the equalizing member 320 is positioned closer to the mold set 100 illustrated in FIGS. 2A and 2B than the temperature control block 310. A non-contact unit (the recess 311a) that is not brought into contact with the block body 311 or the equalizing member 320 is provided in at least one of the non-heating region R1 of the temperature control block 310 and a region opposite to the non-heating region R1 in the equalizing member 320. Accordingly, a temperature distribution of the temperature control block 310 can be further suppressed from being generated by suppressing temperature from increasing on a central side in the third direction (the arrow D3) of the temperature control block 310.

Forth Embodiment

Figure 8:
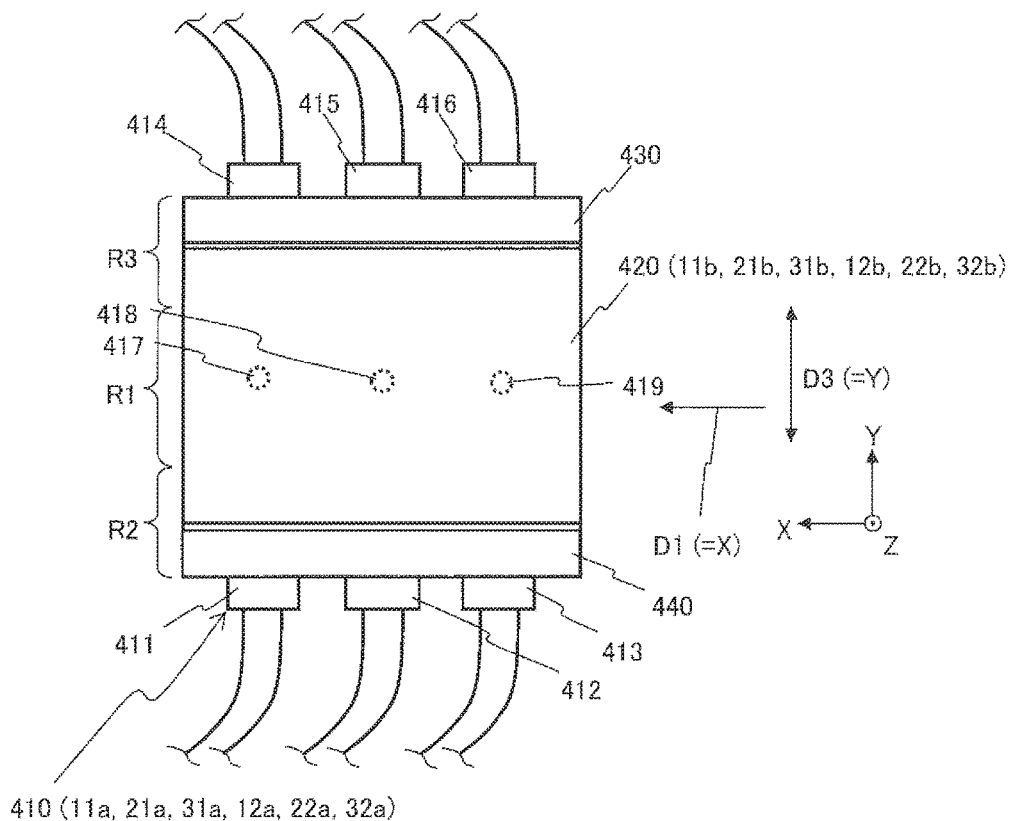
FIG. 8 is a plan view illustrating a pair of heat-insulating members, an equalizing member, and a temperature control block according to a fourth embodiment.

FIG. 8 is a plan view illustrating a pair of heat-insulating members 430 and 440, an equalizing member 420, and a temperature control block 410 according to a fourth embodiment.

According to the fourth embodiment, a configuration similar to the configuration according to the first, second, or third embodiment described above can be employed, except that the pair of heat-insulating members 430 and 440 that are arranged so as to sandwich the equalizing member 420 are respectively arranged opposite to heating regions R2 and R3 of the temperature control block 410. Accordingly, the heat-insulating members 430 and 440 are principally described.

The temperature control block 410 illustrated in FIG. 8 includes cartridge heaters 411 to 416 that are examples of a heating source and thermocouples 417, 418, and 419 that are examples of a temperature measurement unit.

The temperature control block 410 also includes a block body, but the block body is not illustrated in FIG. 8. According to the fourth embodiment, three of the cartridge heaters 411 to 416 are arranged in each of the heating regions R2 and R3 so as to sandwich the thermocouples 417, 418, and 419 in a non-heating region R1 in a third direction (an arrow D3).

The equalizing member 420 has a smaller length in the third direction (the arrow D3) than the length of the temperature control block 410. The pair of heat-insulating members 430 and 440 are arranged in a space other than the equalizing member 420 in the temperature control block 410.

The pair of heat-insulating members 430 and 440 are arranged so as to sandwich the equalizing member 420 in the third direction (the arrow D3). In addition, the pair of heat-insulating members 430 and 440 are respectively arranged opposite to the heating regions R2 and R3 of the temperature control block 410. The pair of heat-insulating members 430 and 440 may be respectively opposite to only portions of the heating regions R2 and R3, or may be opposite to the non-heating region R1 in addition to the heating regions R2 and R3.

It is preferable that the pair of heat-insulating members 430 and 440 be selected from materials having a higher adiabaticity than the equalizing member 420 and a low thermal conductivity. As an example, when hard metal is used for a material of the equalizing member 420, it is preferable that stainless steel or ceramics be selected as a material of the pair of heat-insulating members 430 and 440.

The temperature control block 410, the equalizing member 420, and the pair of heat-insulating members 430 and 440 illustrated in FIG. 8 can be used as the lower stage units 11, 21, and 31 or the upper stage units 12, 22, and 32 illustrated in FIG. 1.

According to the fourth embodiment described above, with respect to matters similar to those according to the first, second, or third embodiment described above, a similar effect, namely, an effect whereby the accuracy of the optical element 202 can be improved by using a simple configuration, can be achieved.

According to the fourth embodiment, the pair of heat-insulating members 430 and 440 are arranged so as to sandwich, in the third direction (the arrow D3), the equalizing member 420 that is positioned closer to the mold set 100 illustrated in FIGS. 2A and 2B than the temperature control block 410. In addition, the pair of heat-insulating members 430 and 440 are respectively arranged opposite to the heating regions R2 and R3 of the temperature control block 410. Accordingly, a temperature distribution of the temperature control block 410 can be further suppressed from being generated by suppressing heat radiation from both ends in the third direction (the arrow D3) of the temperature control block 410.

Fifth Embodiment

FIG. 9 is a plan view illustrating an equalizing member 520 and a temperature control block 510 according to a fifth embodiment.

According to the fifth embodiment, a configuration similar to the configuration according to the first, second, third, or fourth embodiment described above can be employed, except that the equalizing member 520 includes a heat insulator 521 that is provided opposite to a non-heating region R1 of the temperature control block 510. Accordingly, the heat insulator 521 is principally described.

The temperature control block 510 illustrated in FIG. 9 includes cartridge heaters 511 to 516 that are examples of a heating source and thermocouples 517, 518, and 519 that are examples of a temperature measurement unit.

The temperature control block 510 also includes a block body, but the block body is not illustrated in FIG. 9. According to the fifth embodiment, three of the cartridge heaters 511 to 516 are arranged in each of the heating regions R2 and R3 so as to sandwich the thermocouples 517, 518, and 519 in a non-heating region R1 in a third direction (an arrow D3), similarly to the fourth embodiment described above.

The heat insulator 521 of the equalizing member 520 is positioned within a wider range than the non-heating region R1 of the temperature control block 510, and the heat insulator 521 is provided opposite to the entirety of the non-heating region R1 and portions of the heating region R2 and R3. Examples of the heat insulator 521 include a configuration in which a material having a lower thermal conductivity than that of the other portion of the equalizing member 520 is used, a configuration in which a surface in contact with the mold set 100 is reduced, or a configuration in which a cavity is included.

The heat insulator 521 of the equalizing member 520 may be provided only in a portion such as a surface side that abuts onto the mold set 100 in a thickness direction (a Z direction), or may be provided throughout the thickness direction (the Z direction). The heat insulator 521 does not always need to be opposite to the entirety of the non-heating region R1, or does not always need to be opposite to the heating regions R2 and R3.

The equalizing member 520 has the same length as the length of the temperature control block 510 in a first direction (an arrow D1) and the third direction (the arrow D3), unlike the fourth embodiment described above. However, the heat-insulating members 430 and 440 illustrated in FIG. 8 may be arranged, similarly to the fourth embodiment.

The temperature control block 510 and the equalizing member 520 illustrated in FIG. 9 can be used as the lower stage units 11, 21, and 31 or the upper stage units 12, 22, and 32 illustrated in FIG. 1.

According to the fifth embodiment described above, with respect to matters similar to those according to the first, second, third, or fourth embodiment described above, a similar effect, namely, an effect whereby the accuracy of the optical element 202 can be improved by using a simple configuration, can be achieved.

According to the fifth embodiment, the equalizing member 520 includes the heat insulator 521 that is provided opposite to the non-heating region R1 of the temperature control block 510. Accordingly, a temperature distribution of the temperature control block 510 can be further suppressed from being generated by suppressing temperature from increasing on a central side in the third direction (the arrow D3) of the temperature control block 510.

The invention claimed is:

1. An optical element manufacturing apparatus comprising:
    a plurality of pairs of stage units which are configured to have a mold set that houses a molding material transferred through the pairs of stage units along a first direction;
    wherein:
    each of the pairs of stage units comprises two stage units that are arranged opposite to each other along a second direction, which is perpendicular to the first direction, and are configured to sandwich the mold set;
    each of the pairs of stage units is configured to perform at least one of heating, pressurization, and cooling on the mold set;
    each of the stage units includes a temperature control block;
    the temperature control block of at least one of the stage units comprises two heating regions in which heating sources are arranged, and a non-heating region that is positioned between the two heating regions and in which no heating sources are arranged; and
    in the temperature control block of the at least one of the stage units:
        each of the heating regions is a region that extends continuously across the entire temperature block in the first direction;
        the non-heating region is a region that extends continuously across the entire temperature control block in the first direction;
        the two heating regions are positioned at two ends of the temperature control block, and the non-heating region is positioned at a center of the temperature control block between the two heating regions so as to separate the two heating regions from each other, along a third direction which is perpendicular to both the first direction and the second direction;
        the heating sources are provided in the heating regions on both sides of the non-heating region along the third direction;

the non-heating region is a region without any heating sources across the entire temperature control block in the first direction and without any heating sources between the two heating regions along the third direction.

2. The optical element manufacturing apparatus according to claim 1, wherein in the third direction, a ratio of a length Lc of the non-heating region to an entire length La of the temperature control block of the at least one of the stage units satisfies:

$$0.2 \leq Lc/La \leq 0.8.$$

3. The optical element manufacturing apparatus according to claim 1, wherein:
the temperature control block of the at least one of the stage units includes a plurality of temperature measurement units that are arranged in the non-heating region so as to have a space from each other in the first direction; and
in the temperature control block of the at least one of the stage units, the heating sources are arranged in the heating regions so as to sandwich the plurality of temperature measurement units in the third direction.

4. The optical element manufacturing apparatus according to claim 1, wherein:
the at least one of the stage units includes an equalizing member that is arranged to be positioned closer to the mold set than the temperature control block; and
in the at least one of the stage units, a non-contact unit is provided in at least one of the non-heating region of the temperature control block and a region opposite to the non-heating region in the equalizing member, wherein the non-contact unit is configured so as not to be brought into contact with another of the non-heating region and the region opposite to the non-heating region.

5. The optical element manufacturing apparatus according to claim 1, wherein:
the at least one of the stage units includes an equalizing member that is arranged to be positioned closer to the mold set than the temperature control block; and
the at least one of the stage units includes a pair of heat-insulating members that are arranged so as to sandwich the equalizing member in the third direction, and the pair of heat-insulating members are respectively arranged opposite to the heating regions of the temperature control block.

6. The optical element manufacturing apparatus according to claim 1, wherein:
the at least one of the stage units includes an equalizing member that is arranged to be positioned closer to the mold set than the temperature control block, wherein the equalizing member includes a heat insulator that is provided opposite to the non-heating region of the temperature control block.

7. The optical element manufacturing apparatus according to claim 2, wherein in the third direction, the ratio of the length Lc of the non-heating region to the entire length La of the temperature control block of the at least one of the stage units satisfies:

$$0.4 \leq Lc/La \leq 0.6.$$

8. The optical element manufacturing apparatus according to claim 1, wherein the temperature control block of the at least one of the stage units includes a temperature measurement unit that is arranged in the non-heating region.

9. The optical element manufacturing apparatus according to claim 1, wherein the temperature control block of the at least one of the stage units is the temperature control block of a stage unit that performs cooling on the mold set.

10. The optical element manufacturing apparatus according to claim 1, wherein the temperature control block of the at least one of the stage units is the temperature control block of a stage unit that performs pressurization on the mold set.

11. The optical element manufacturing apparatus according to claim 1, wherein the temperature control block of each of the stage units includes the two heating regions in which heating sources are arranged and the non-heating region that is positioned between the two heating regions and in which no heating sources are arranged.

\* \* \* \* \*